(12) United States Patent
Dunning

(10) Patent No.: US 6,179,452 B1
(45) Date of Patent: Jan. 30, 2001

(54) AIRCRAFT LIGHTING SYSTEM

(76) Inventor: Stephen C. Dunning, 14610 Chermoore, Chesterfield, MO (US) 63017

( * ) Notice: Under 35 U.S.C. 154(b), the term of this patent shall be extended for 0 days.

(21) Appl. No.: 09/122,935

(22) Filed: Jul. 27, 1998

(51) Int. Cl.[7] .................................................... F21V 9/16
(52) U.S. Cl. ........................... 362/470; 362/84; 362/223
(58) Field of Search ............................. 362/84, 470, 471, 362/217, 223; 244/118.5; 40/542, 544

(56) References Cited

U.S. PATENT DOCUMENTS

| | | |
|---|---|---|
| 3,811,043 | 5/1974 | Cope et al. . |
| 4,104,555 | 8/1978 | Fleming . |
| 4,233,652 | 11/1980 | Oswald . |
| 4,328,532 | 5/1982 | Smith . |
| 4,365,232 | 12/1982 | Miller . |
| 4,367,514 | 1/1983 | Large et al. . |
| 4,521,835 | 6/1985 | Meggs et al. . |
| 4,581,683 | 4/1986 | Reiter et al. . |
| 4,597,033 | 6/1986 | Meggs et al. . |
| 4,864,473 * | 9/1989 | Tokarz et al. ........................... 362/84 |
| 4,887,189 | 12/1989 | Garrett . |
| 4,903,175 | 2/1990 | Cotton . |
| 4,934,793 | 6/1990 | Klein . |
| 5,031,080 | 7/1991 | Aikens et al. . |
| 5,124,892 | 6/1992 | Lambert . |
| 5,140,472 | 8/1992 | Langner et al. . |
| 5,143,433 | 9/1992 | Farrell . |
| 5,280,415 | 1/1994 | Barnette . |
| 5,339,550 * | 8/1994 | Hoffman ................................. 362/84 |
| 5,353,205 | 10/1994 | Hudak . |
| 5,381,312 | 1/1995 | Authier . |
| 5,499,170 * | 3/1996 | Gagne .................................... 362/84 |
| 5,779,346 * | 7/1998 | Burke .................................... 362/84 |
| 5,876,106 * | 3/1999 | Kordecki ............................... 362/84 |
| 5,961,072 * | 10/1999 | Bodle ................................. 244/118.5 |

* cited by examiner

Primary Examiner—Thomas M. Sember
(74) Attorney, Agent, or Firm—Howell & Haferkamp, LC

(57) ABSTRACT

A flexible lighting fixture includes an elongate channel having a bottom, opposing sides, first and second ends. An elongate electroluminescent lamp, having first and second ends, is disposed in the channel, between the opposing sides, with the first end generally adjacent the first end of the channel and the second end generally adjacent the second end of the channel. The electroluminescent lamp has contacts at the first end thereof, with wire leads connected to contacts on the electroluminescent lamp. A translucent cover is mounted in the channel, over the over the electrohiminescent lamp, and is engaged by the opposing sides of the channel. An encapsulant in the first end of the channel secures the first end of the electroluminescent lamp in the channel, but the remainder of the electroluminescent lamp is unattached to the channel so that when the fixture flexes, the remainder of the electroluminescent lamp can slide relative to the channel. The lighting fixture is preferably incorporated in a lighting system, comprising an inverter adapted to be connected to the DC electrical system of the aircraft to provide AC power; a battery; and a switch for selectively connecting the inverter to the electroluminescent lamp to the DC electrical system of the aircraft or to the battery.

8 Claims, 3 Drawing Sheets

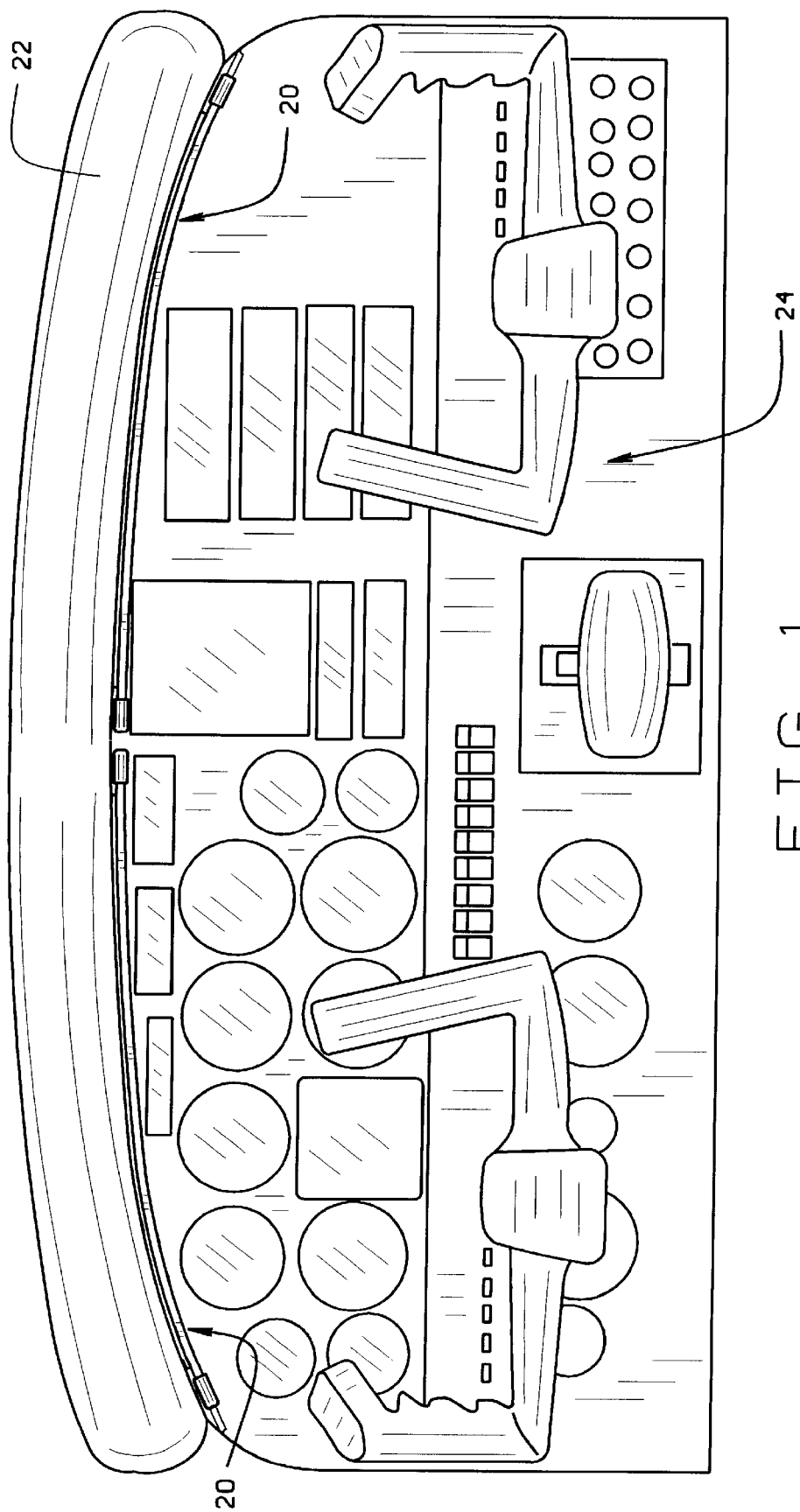

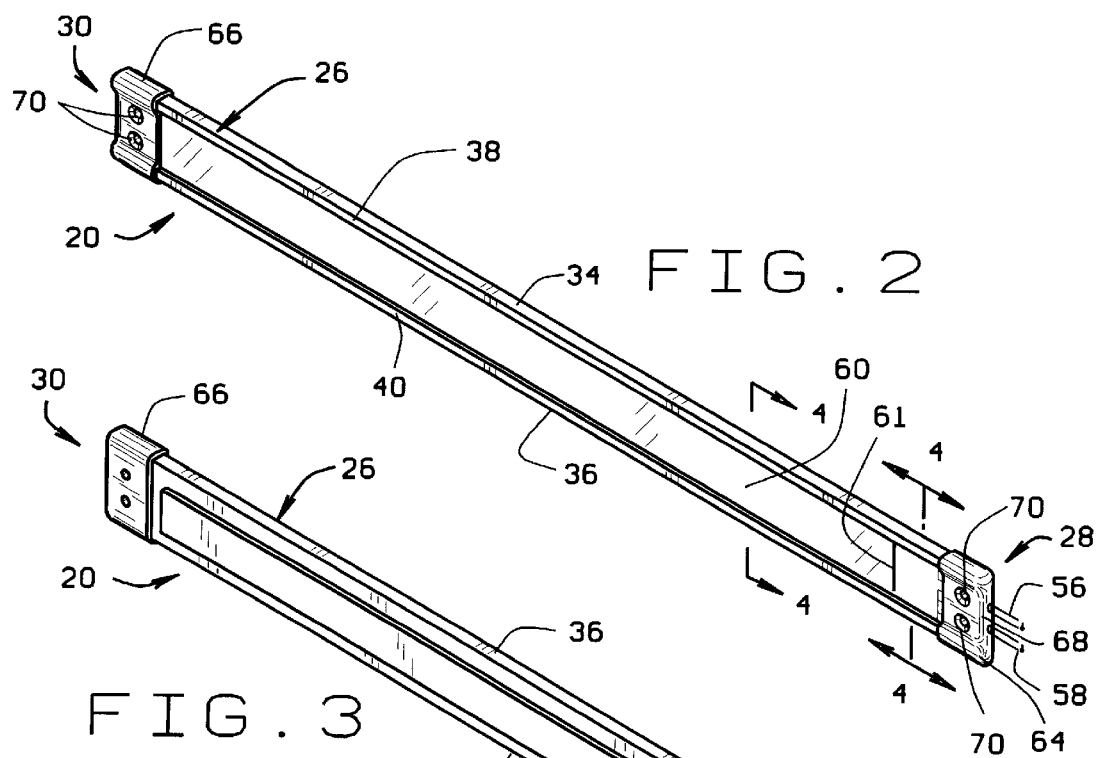
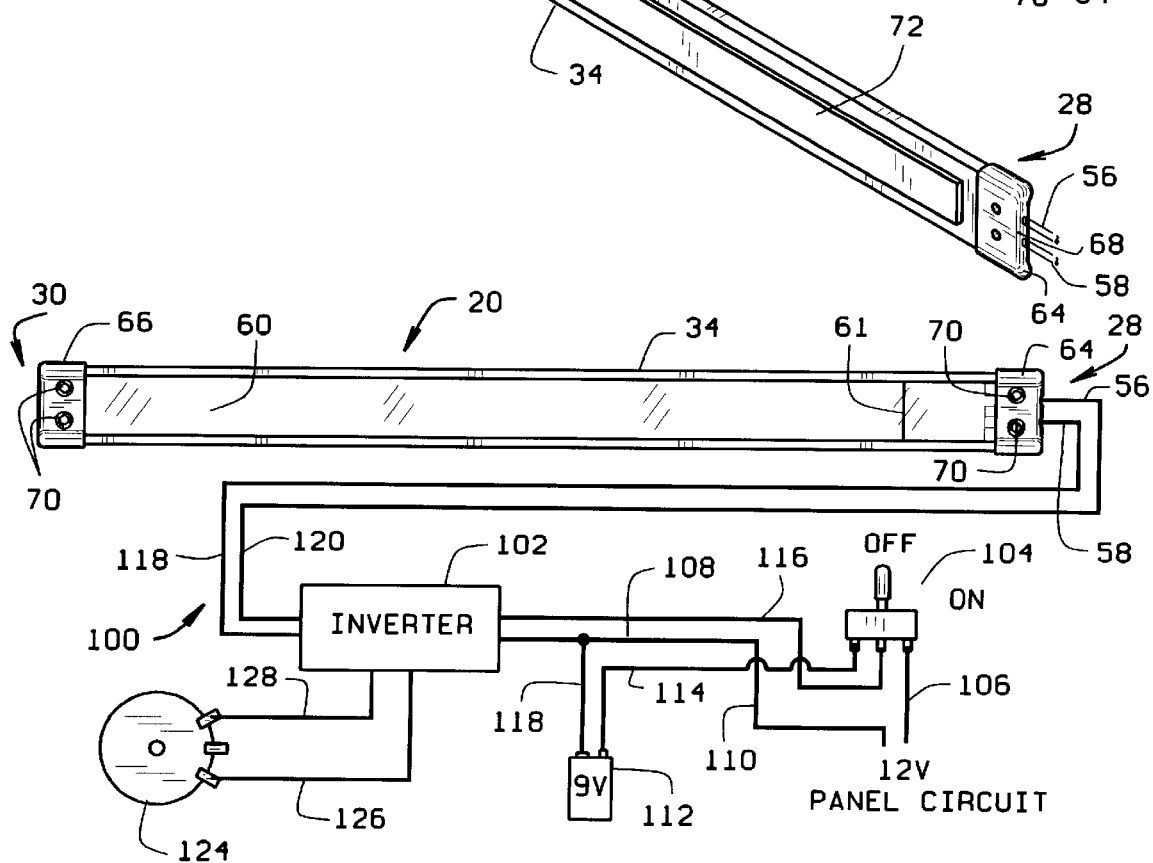

AIRCRAFT LIGHTING SYSTEM

FIELD OF THE INVENTION

This invention relates to vehicle lighting systems, and in particular to a lighting system adapted to be installed in the cockpit of a plane to provide illumination.

BACKGROUND OF THE INVENTION

The lighting in vehicles, and in particular inside the cockpits of planes, is often inadequate. The manufacturer may include some incandescent lights, but these are often entirely dependent on the vehicle's electrical system, consume a lot of power, generate heat, and provide harsh light that interferes with the operator's night vision. It is difficult to retrofit additional lighting in existing vehicles. There are few appropriate locations to mount standard incandescent or fluorescent fixtures where they can provide useful light. Moreover, these fixtures typically have bulky, rigid housings, and custom fixtures are too expensive for most applications. Many retrofit light fixtures are also unattractive, detracting from the appearance of the vehicle interior.

One attempt to solve the problem of cockpit lighting is Hudak, U.S. Pat. No. 5,353,205, which discloses a lighting device which may be detachably, rotatably attached to an earpiece of a pilots earphone headset or helmet. This device only provides light where the pilot looks, and thus does not provide general in the cockpit for reading charts and the or scanning the instruments, nor is it a substitute if there is a general failure of the instrument panel lighting. Similarly, Lambert, U.S. Pat. No. 5,124,892 discloses a finger-mounted light for use in airplanes.

Other attempts at improving lighting in aircraft cockpits include Langner et al., U.S. Pat. No. 5,140,472; Barnette, U.S. Pat. No. 5,280,415; Meggs et al., U.S. Pat. No. 4,521,835; Aikens et al., U.S. Pat. No. 5,031,080, and Garrett, U.S. Pat. No. 4,887,189, and Cotton, U.S. Pat. No. 4,903,175.

Electroluminescent lamps are known, see Fleming, U.S. Pat. No. 4,104,555, incorporated herein by reference, and these lamps have been employed on aircraft to provide emergency escape lighting, see, for example, Miller, U.S. Pat. No. 4,365,232, incorporated herein by reference. However this device was not adapted to provide illumination of the cockpit or the instrument panel, nor with rigid, bulky configuration was it adapted to be mounted under the glare shield or in other locations in and around the cockpit. Electroluminescent lamps have also be used in the illumination of instruments. See, for example Reiter et al., U.S. Pat. No. 4,581,683 and Smith, U.S. Pat. No. 4,328,532, incorporated herein by reference.

SUMMARY OF THE INVENTION

The present invention relates to a lighting fixture that is thin and flexible and thus is easy to install in a variety of locations inside a vehicle, for example on the underside of the glare shield. The lighting fixture comprises an elongate U-shaped channel having a bottom and opposing sides. An elongate electroluminescent lamp is disposed in the channel and has electrical contacts at one end. Wire leads are connected to the contacts, and extend from the lamp. A translucent cover is secured in the opposing sides of the channel, over the lamp, forming a sleeve with the channel the encloses the lamp. The end of the lamp with the contacts is encapsulated to protect the connection between the contacts and the wire leads, and to secure the end of the lamp in the sleeve. The remainder of the lamp is unattached to the channel or the cover, so that when the fixture is flexed the remainder of the lamp can slide in the sleeve. End caps can be provided on the ends of the sleeve.

In the preferred embodiment, the end caps are secured by grommets that also provide for convenient screw mounting of the light fixture. An adhesive, such as a double stick tape, can also be provided for mounting the lighting fixture.

The light fixture is preferably part of a lighting system adapted to be connected to the vehicle's electrical system, which is typically either a 12V or 24V DC system. The lighting system includes an inverter adapted to be connected to the vehicle's DC electrical system. The lighting system also includes a battery for powering the inverter (and thus the lamp) in the event of a failure of the vehicle's electrical system, or when it is desired to conserve power from the vehicle's electrical system. The lighting system also includes a switch for selectively connecting the inverter to the vehicle's electrical system or to the battery or disconnecting the inverter from either power source to turn the light off.

In the preferred embodiment, the inverter includes a circuit that automatically adapts to 12V or 24V DC power, so that the lighting system can be used in vehicles with either type of power system. In the preferred embodiment, a fuse is provided in the connection to the vehicle's power supply, but not in connection to the battery, so that if the electrical system causes the fuse to fail, the lighting system can still be operated with the battery.

The light fixture of the present invention is adapted to be easily retrofit to existing vehicle interiors. Its thin profile and flexibility allow it to be easily mounted on many interior surfaces, such as the underside of a glare shield. The lighting system is easily retrofit as well. In the preferred embodiment, the inverter automatically adjusts to the voltage of the vehicle's electrical system. The switch allows the user to quickly turn the light on or off, and switch from vehicle power to auxiliary battery power. The light from the fixture is preferably of a color and intensity selected so as not to interfere with the user's natural night vision, nor with night vision devices. A dimmer allows the user to adjust the level of light.

These and other features and advantages will be in part apparent and in part pointed out hereinafter.

BRIEF DESCRIPTION OF THE DRAWINGS

FIG. 1 is an elevation view of a airplane cockpit, showing two lighting fixtures constructed according to the principles of this invention, mounted on the underside of the glare shield;

FIG. 2 is a front perspective view of one of the lighting fixtures;

FIG. 3 is a rear perspective view of one of the lighting fixtures;

FIG. 6 is a schematic view of a lighting system constructed according to the principles of this invention, incorporating one of the lighting fixtures.

Corresponding reference numerals indicate corresponding parts throughout the several views of the drawings.

DETAILED DESCRIPTION OF THE INVENTION

Figure 4:
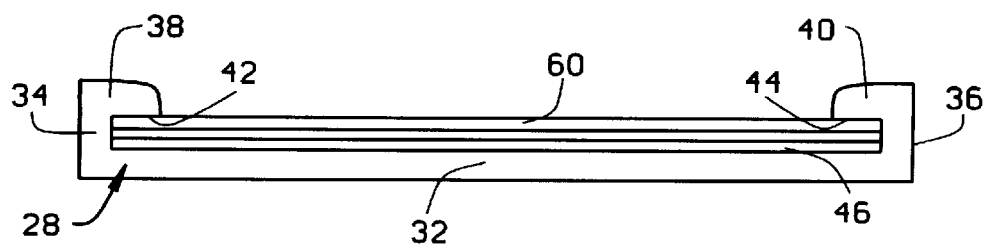
FIG. 4 is a transverse cross sectional view taken along the plant of line 4—4 in FIG. 1.

Two lighting fixtures 20, constructed according to the principles of This invention, are shown in FIG. 1 as they would be mounted on the underside of a glare shield 22 in the cockpit 24 of a plane. Each of the lighting fixtures 20 comprises an elongate channel 26, having first: and second ends 28 and 30. The channel 26 has a generally U-shaped cross section, with a generally flat bottom 32, and opposing sides 34 and 36. As shown in FIG. 4, the opposing sides 34 and 36 have inwardly extending lips 38 and 40, respectively, which include surfaces 42 and 44 that face the bottom 32 of the channel 26. The channel 26 may be made of extruded black PVC plastic.

An elongate electroluminescent lamp 46, having first and second ends; 48 and 50, is positioned in the channel 26, on the bottom 32. The electroluminescent lamp 46 has contacts 52 and 54 adjacent the first end 48. An electroluminescent lamp is a "cold" light source operating close to ambient temperature. Such lamps operate under AC power. Suitable electroluminscent lamps are available from Eltech, 2113 Wells Branch Parkway, Austin, Tex. 78728, or from Durel Corp., 2225 West Chandler Boulevard, Chandler, Ariz. 85244. The electroluminescent lamp 46 is preferably about 0.01 inches thick and flexible. The lamp is resistant to shock and vibration. Wire leads 56 and 58 are secured to the contacts 52 and 54, respectively with crimp connectors and solder, or other suitable means.

A translucent cover 60 is provided in the channel 26, over the electroluminescent lamp 46. The cover 60 may be made of Lexan, or other suitable material. The surfaces 42 and 44 on lips 38 and 40 engage the edges margins of the cover 60, retaining it in the channel 26. Together, the channel 26 and the cover 60 form a sleeve 62 that encloses the electroluminescent lamp. A shield 61 of translucent material is disposed between the electroluminescent lamp 46 and the cover 60, adjacent the first end 48 of the lamp, to stiffen the fixture 20 adjacent the first end 28, and prevent buckling.

The connection between the wire leads 56 and 58 and the contacts 52 and 54 on the first end 48 of the electroluminescent lamp 46 are preferably encapsulated. The encapsulant is preferably an epoxy that also secures the electroluminescent lamp 46 in the channel. The remainder of the electroluminescent lamp 46 is not attached to the channel 26 or cover 60, so that when the light fixture 20 is flexed, the second end of the lamp can slide in the sleeve 62.

The ends of the sleeve 62 are preferably closed with first and second end caps 64 and 66 (not shown in FIG. 4). The end caps can be dip-molded from a flame resistant plastisol. The first end cap 64 has an opening 68 for accommodating the wire leads 56 and 58. The end caps 64 and 66 are preferably secured on the sleeve 62 with grommets 70 that, in addition to securing the end caps, also provide convenient mounting holes for receiving fasteners, such as screws. A pair of holes 74 are provided in each end of the channel (see FIG. 4) for accommodating the grommets 70. A strip 72 of double-stick adhesive, with a removable protective cover, can be provided on the underside of the channel to help secure the fixture.

Figure 7:
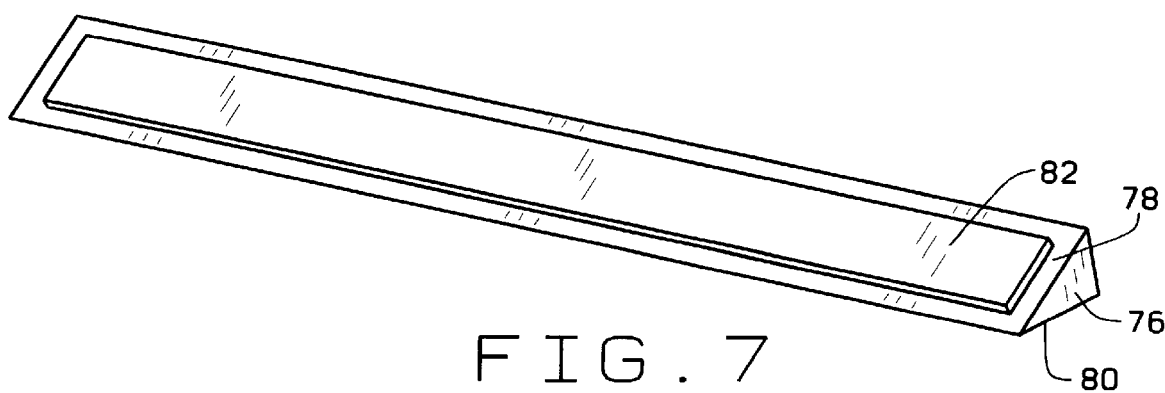
FIG. 7 is a perspective view of a mounting wedge for mounting lighting fixtures according to the principles of the present invention.

As shown in FIG. 7, an elongate wedge member 76 can be provided for mounting the light fixture 20 at an angle. The wedge member 76 has a first and second surface 78 and 80. The first surface 78 has a strip 82 of double-stick adhesive with a removable protective cover for securing the wedge member 76 on a surface, for example the underside of glare shield 22. The second surface 80 is generally flat, and is adapted to mount the light fixture 20, for example with the adhesive strip 72 thereon. The wedge member can be made, for example, from extruded PVC.

Figure 5:
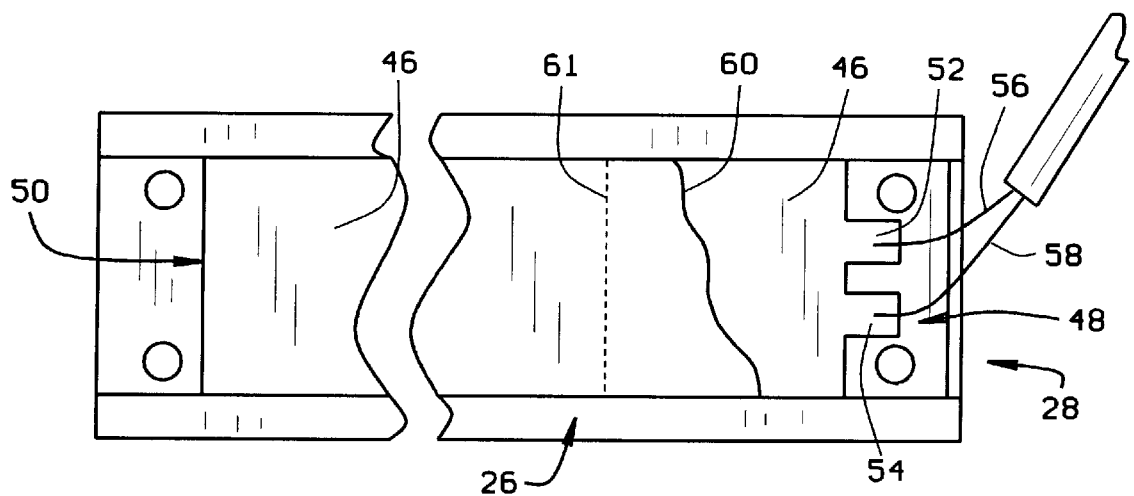
FIG. 5 is an enlarged partial plan view of the lighting fixture with the end caps removed to show details of construction.

The lighting fixture 20 is preferably part of a lighting system 100, shown schematically in FIG. 5. The lighting system 100 comprises an electroluminescent light fixture 20, an inverter 102 for generating the relatively high voltage, high frequency AC current to operating the electroluminescent lamp in the electroluminescent light fixture. The inverter 102 is connected to the vehicle's electrical system through a three-position toggle switch 104. More specifically a first line 106 extends from the vehicle's electrical system to an input lead on the switch 104. A second line 108 extends from a first output lead on the switch 104 to the inverter 102. A third line 110 extends directly from the vehicle's electrical system to the inverter 102. The inverter 102 is also connected to a battery back upl 12 through the switch 104. The battery back up 112 can be a conventional 9 V. A fourth line 114 extends from one of the battery terminals to a second input lead on the switch 104. A fifth line 116 extends from a second output lead on the switch 104 to the inventer, and a sixth line 118 extends from the other of the battery's terminals to the third line 110. The switch 102 is operable between a first position in which no power is connected to the light fixture 20, a second position in which the vehicle's electrical system is connected to the to the light fixture, and a third position in which the battery 110 is connected to the light fixture.

The inverter is preferably a conventional inverter circuit adapted to input from a conventional 12V DC or 24V DC electrical system, or a 9 V DC battery. The inverter circuit preferably automatically adapts to the input voltage, without the need to operate a switch. The output of the inverter is sufficient to power the lamp in the fixture 20, typically 110 V AC at 600 Hz. The inverter circuit is preferably mounted in an aluminum case and potted in an epoxy resin. Output lines 118 and 120 are connected to the leads 56 and 58 of the light fixture 20.

A rotary switch 124 is connected to the inverter with lines 126 and 28. The rotary switch 124 controls a pulse modulator in the inverter 102 to control the intensity of the lamp in the fixture 20. The rotary switch 124 may be, for example, linear potentiometer.

A fuse can be provided in the input line 106 or 108, to protect the inverter from power variations from the vehicle's electrical system. In the event that the fuse is blown, the lighting fixture 20 can still be operated with the battery back up 110, simply by operating the switch 102.

A trickle charger can also be incorporated into the system 100 to keep the battery 112 charged.

OPERATION

In operation, the light fixture 20 is installed in the interior of a vehicle, for example on the underside of the glare shield 22 of the cockpit of a plane. The flexibility of the fixture 20, allows it to conform to the contour of the underside of the glare shield, and fit flush against the surface, low profile of the fixture ensures that the light fixture does not unduly impair the finished appearance of the cockpit. The fixture can be secured by removing the protective backing from the double stick tape, and/or driving screws through the mounting holes formed by the grommets 72. If desired the lighting fixture 20 can be mounted at an angle, for example on the underside of the glare shield 22 to face the instrument panel, by first mounting wedge member 76 on the glare shield, and mounting the lighting fixture 20 on the wedge member.

Once secured the light fixture can be connected to the lighting system 100. The leads 56 and 58 from the lamp 46 are connected to the wires 118 and 120. The lines 106 and 110 are connected to the electrical system of the vehicle, and the lines 114 and 116 are connected to the battery 112. The switch 102 operates the system. In its first position no power is connected to the lamp, and the lamp is unlit. In its second position the vehicle electrical system is connected to the inverter, and the lamp is lit by power from the vehicle's electrical system. In its third position, the battery 112 is connected to the inverter, and the lamp is lit by power from the battery. A conventional 9V battery can provide sufficient power to operate the lamp for 8 hours. Thus the lighting system can be used on the ground to conserve the plane's electrical system, and in the air, in the event of a failure of the vehicle's electrical system.

The light provided by the electroluminescent lamps used in the present invention are sufficiently bright to illuminate the interior of the airplane, but do not interfere with the operators natural night vision, or the use of night vision enhancing equipment.

What is claimed is:

1. A flexible lighting fixture comprising:
    an elongate channel having a bottom, opposing sides, first and second ends;
    an elongate electroluminescent lamp, having first and second ends, disposed in the channel, between the opposing sides, with the first end generally adjacent the first end of the channel and the second end generally adjacent the second end of the channel, the electroluminescent lamp having contacts at the first end thereof;
    wire leads connected to contacts on the electroluminescent lamp;
    a translucent cover in the channel, over the electroluminescent lamp, and engaged by the opposing sides of the channel;
    an encapsulant in the first end of the channel securing the first end of the electroluminescent lamp in the channel, but allowing the remainder of the electroluminescent lamp being unattached to the channel so that when the fixture flexes, the remainder of the electroluminescent lamp can slide relative to the channel.

2. The lighting fixture according to claim 1 further comprising an adhesive tape on the underside for securing the lighting fixture onto a surface.

3. The lighting fixture according to claim 1 further comprising end caps on each end of the channel.

4. The lighting fixture according to claim 1 wherein the end caps each have at least one hole therein for securing the lighting fixture onto a surface.

5. The lighting fixture according to claim 1 further comprising a shield between the electroluminescent lamp and the cover, adjacent the first end of the electroluminescent lamp with the contacts, to stiffen the first end of the channel and prevent buckling of the fixture near the contacts.

6. A lighting system adapted to be connected to the DC Electrical System of an aircraft to provide lighting inside the aircraft during normal operation, and to provide emergency lighting inside the aircraft upon failure of the electrical system, the lighting system comprising:
    an electroluminescent lamp;
    an inverter adapted to be connected to the DC electrical system of the aircraft to provide AC power;
    conventional 9V battery,
    a switch for selectively connecting the inverter to the electroluminescent lamp to the DC electrical system of the aircraft to the battery.

7. A lighting system adapted to be connected to the DC Electrical System of an aircraft to provide lighting inside the aircraft during normal operation, and to provide emergency lighting inside the aircraft upon failure of the electrical system, the lighting system comprising:
    an electroluminescent lamp;
    an inverter adapted to be connected to the DC electrical system of the aircraft to provide AC power, the inverter automatically adapting to 12 V and 24 V DC power from the electrical system of the aircraft;
    a battery;
    a switch for selectively connecting the inverter to the electroluminescent lamp to the DC electrical system of the aircraft to the battery.

8. A lighting system adapted to be connected to the DC Electrical System of an aircraft to provide lighting inside the aircraft during normal operation, and to provide emergency lighting inside the aircraft upon failure of the electrical system, the lighting system comprising:
    a light fixture comprising an elongate electroluminescent lamp, with first and second ends, and contacts at the first end thereof; an elongate channel having a bottom, opposing sides, first and second ends, in which the electroluminescent lamp is disposed; wire leads connected to the contacts on the electroluminescent lamp; a translucent cover in the channel, over the electroluminescent lamp, and engaged by the opposing sides of the channel; and an encapsulant in the first end of the channel securing the first end of the electroluminescent lamp in the channel, but the remainder of the electroluminescent lamp being unattached to the channel so that when the fixture flexes, the remainder of the lamp can slide relative to the channel;
    an inverter adapted to be connected to the DC electrical system of the aircraft to provide AC power;
    a battery;
    a switch for selectively connecting the inverter to the electroluminescent lamp to the DC electrical system of the aircraft to the battery.

* * * * *